United States Patent [19]

Nuscheler et al.

[11] Patent Number: 5,387,851

[45] Date of Patent: Feb. 7, 1995

[54] CLOSED LOOP CONTROL APPARATUS WITH FREQUENCY FILTERS FOR CONTROLLING AN AIR GAP WIDTH IN ELECTROMAGNETIC LEVITATION SYSTEMS

[75] Inventors: Reinhard Nuscheler, Schwifting; Hans Wessner, Markt Indersdorf, both of Germany

[73] Assignee: MTU Motoren-und Turbinen-Union Muenchen GmbH, Munich, Germany

[21] Appl. No.: 932,292

[22] Filed: Aug. 19, 1992

[30] Foreign Application Priority Data

Aug. 22, 1991 [DE] Germany .............. 4127879

[51] Int. Cl.[6] .......................................... H02K 29/00
[52] U.S. Cl. .................................. 318/135; 248/550; 318/587
[58] Field of Search ................ 248/550, 562, 638; 188/267; 267/140.14, 140.15; 310/90.5; 318/135, 587

[56] References Cited

U.S. PATENT DOCUMENTS

| | | | |
|---|---|---|---|
| 4,000,929 | 1/1977 | Studer | 310/90.5 |
| 4,244,629 | 1/1981 | Habermann | 310/90.5 |
| 4,505,206 | 3/1985 | Gottzein et al. | |
| 4,585,282 | 4/1986 | Bosley | 310/90.5 |
| 4,624,435 | 11/1986 | Freudenberg | 248/550 |
| 4,795,927 | 1/1989 | Morii et al. | |
| 5,011,108 | 4/1991 | Chen et al. | |
| 5,022,628 | 6/1991 | Johnson et al. | 248/638 |
| 5,269,159 | 12/1993 | Oh | 248/638 X |
| 5,275,388 | 1/1944 | Kobayashi et al. | 267/140.14 |
| 5,285,995 | 2/1994 | Gonzalez | 248/550 |

FOREIGN PATENT DOCUMENTS

3117971 11/1982 Germany.
1020851 2/1966 United Kingdom.

*Primary Examiner*—Alvin C. Chin-Shue
*Assistant Examiner*—Derek J. Berger
*Attorney, Agent, or Firm*—W. G. Fasse; W. F. Fasse

[57] ABSTRACT

A closed loop control and a closed loop control method use frequency filters for controlling the width of an air gap in an electromagnetic levitation system between a machine bed and a mass, such as a machine to be levitated. The control includes closed loop control elements to electromagnetically simulate a mechanical spring having a variable, sonic frequency-dependent spring characteristic including the spring rate and damping for providing an acoustic insulation to prevent vibration transmissions into the machine bed. The control element includes filters responsive to sonic frequencies. The closed loop control supports and guides the levitated machine within narrow air gap widths in the very low frequency range and prevents the transmission of vibration forces to the machine bed in the low, medium and high frequency ranges. This closed control can be used for the electromagnetic noise-insulated levitation of machines in vibration-sensitive structures, such as ships, aircraft, buses, and steel structures, or reinforced concrete structures.

12 Claims, 2 Drawing Sheets

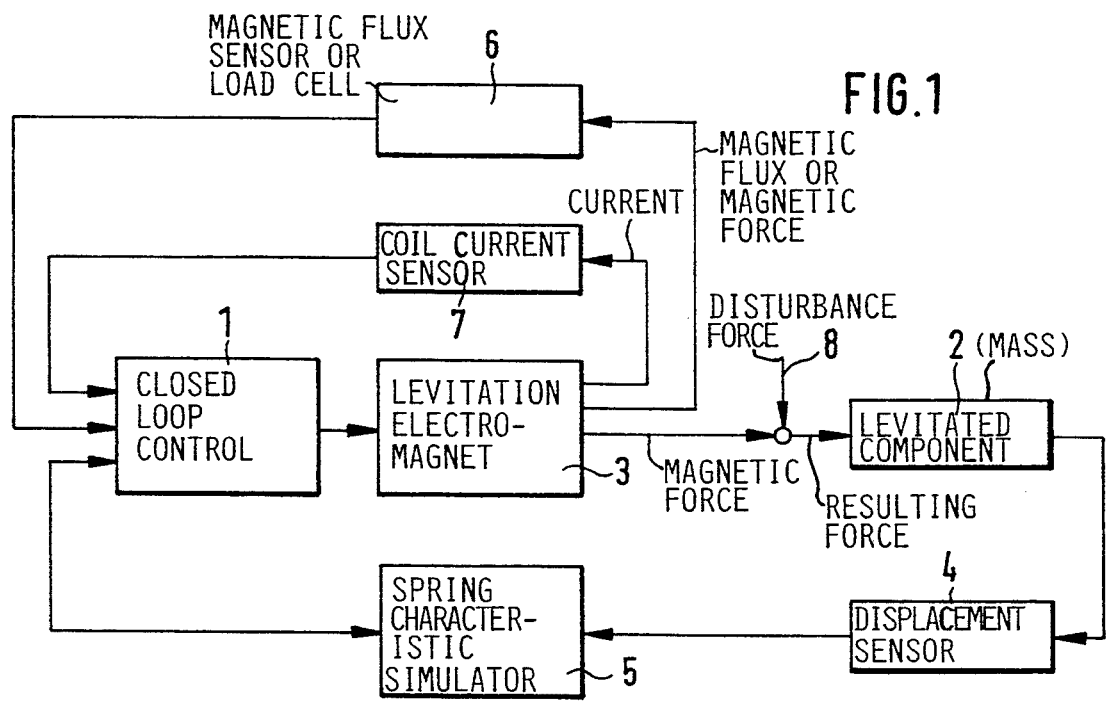
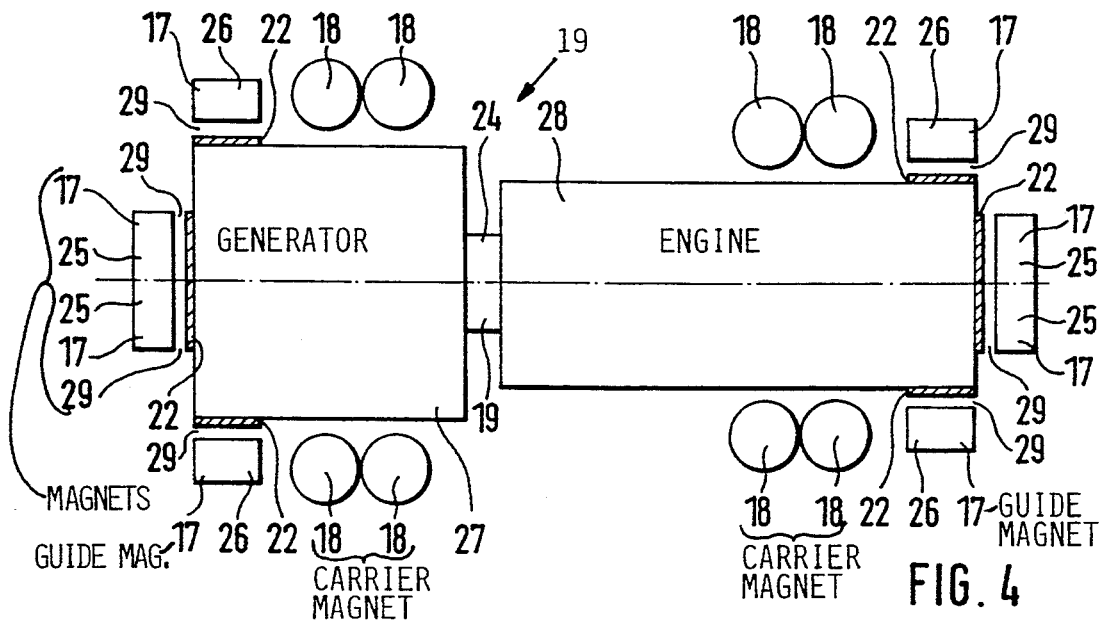

CLOSED LOOP CONTROL APPARATUS WITH FREQUENCY FILTERS FOR CONTROLLING AN AIR GAP WIDTH IN ELECTROMAGNETIC LEVITATION SYSTEMS

FIELD OF THE INVENTION

This invention relates to a closed loop control apparatus with frequency filters for controlling air gap widths in electromagnetic levitation systems, between a machine bed and a machine.

BACKGROUND INFORMATION

German Patent Publication (DE-PS) 3,117,971, corresponding to U.S. Pat. No. 4,505,206 (Gottzein et al.), published Mar. 19, 1985, discloses a control system for adapting the air gap width between electromagnetically levitated vehicles and a rail, to an optimal performance. The known control loop contains nonlinear elements and essentially equalizes intermittent, short duration disturbances. For this purpose, the rated air gap setting is increased on route segments with large roadway disturbances. This type of control has the disadvantage of so-called constant-clearance control systems that keep the air gap width at a constant width determined also by the frequency of roadway disturbances. This feature causes a hard coupling between the vehicle and the rail segments. The action of a hard coupling is comparable to that of a hard mechanical spring, the static spring rate or stiffness of which is infinitely high. Another disadvantage in the known control system is that it does not provide any acoustic damping in the low and medium sonic frequency ranges.

In ships or submarines, electromagnetic levitation systems equipped with a constant air gap width control as disclosed in the above mentioned reference, transmit machine-related vibrations of, e.g., power supply units, prime movers or auxiliary power units to the machine bed and hence to the hull, which involves the risk of sonar detection and damage to the structure. In other vibration-sensitive structures, such as aircraft, buse, railroad trains, steel structures, or reinforced concrete structures, a constant air gap width control of the electromagnetic levitation system for machines, causes a high structure-borne noise coupling in the low and medium sonic frequency ranges thereby producing disadvantageously high noise levels.

OBJECTS OF THE INVENTION

In view of the foregoing it is the aim of the invention to achieve the following objects singly or in combination:

to provide a closed loop control apparatus and a control method for controlling an air gap width in electromagnetic levitation systems so that an effective acoustic decoupling or isolation of structure-borne or body noise is achieved between machine caused or generated vibrations and the movements of a structure, such as a machine bed capable of vibrating;

to construct a magnetically levitating mechanism with an inherent noise frequency isolation characteristic;

to provide a variable noise damping characteristic for a magnetically levitating system by simulating a mechanical spring with an electromagnetic simulator that provides a noise frequency dependent spring stiffness and damping characteristic;

to construct a magnetically levitating system in such a way that all active components of the levitating system are stationary and only passive components of the system, such as armatures, are part of the levitated component;

to reduce the inherent spring stiffness and damping characteristic of the magnetically levitating mechanism in response to a rising body noise frequency for providing a substantially complete body noise damping for high sonic frequencies and for ultrasonic frequencies; and to control the energizing current through the coils of electromagnets for levitating a torque moment transmitting system, in response to the torque moment.

SUMMARY OF THE INVENTION

The foregoing objects have been achieved according to the invention by a closed loop control system for the control of air gap widths between a machine bed and a machine, in electromagnetic levitation supports for the machine, wherein the closed loop control comprises control loop elements forming an electromagnetic simulation of the mechanical stiffness and damping characteristic of a spring that is variable in response to sonic and ultra sonic frequencies for the isolation of acoustic noise caused by the noise frequencies, whereby the control loop element comprises a current regulator or controller and frequency filters so constructed that at low and medium sonic frequencies an active control of the electric current flowing through the levitating magnet coils is provided in response to the output of magnetic flux sensors and displacement pickups or load cells and displacement pickups. At high sonic and ultra sonic frequencies an active control of said current through said levitating magnet coils is preferably blocked, since high noise isolation is achieved only by the generated currents caused by the air gap variations at these frequencies. It is an advantage of the invention that the spring rate or the spring stiffness and the damping of the electromagnetic levitation system can be adapted to or rather, is directly responsive to the sonic frequencies. The closed loop control elements for electromagnetically simulating a mechanical spring with a variable, sonic frequency-dependent spring rate and damping characteristic, are provided with control signals which represent the sonic frequencies to be converted to spring rate and damping values. If the control signals are individual pulses or if these control signals represent approximately static load variations, the closed loop control selects a high spring rate similar to a constant air gap width control for electromagnetic levitation systems. For medium, high and ultrahigh sonic frequencies the present closed loop control simulates a spring rate and damping characteristic approaching zero. Conventional mechanical spring damping systems achieve this effect only in approximation. The present closed loop control avoids this and other disadvantages of a sonic coupling at low and medium frequencies that have heretofore been associated with electromagnetic levitation systems.

In a preferred embodiment of the present invention the electromagnets with their solenoids or magnetic coils and magnetic cores of the electromagnetic levitation system are installed on the machine bed or foundation while the associated armatures are arranged on the machine casing. This feature has the advantage that only passive components, namely the armatures of the electromagnetic leviation system are secured to the machine, so that the mass of the machine to be levitated is not increased by power cables and massive coils or iron cores. These latter components of the system are part of the active components including the control loop elements, the solenoids, current meters, displacement sensors and magnetic flux or force sensors which are installed on the foundation whereby these components become better accessible for an improved maintainability.

For measuring the magnetic flux caused by the electric current flowing through the solenoids, preferably magnetic flux sensors are used in the electromagnetic levitation system, which cooperate with a current regulator and a control unit for adjusting and controlling the electric current flowing through the solenoids in a closed loop system.

In a further embodiment of the present invention the magnetic force caused by the electric current flowing through the solenoid is measured instead of the magnetic flux. The magnetic force is measured by force pickups or load cells. For this purpose, load cells are arranged on the machine bed between the machine bed and the magnetic cores. The output signals of the load cells are supplied to the current regulator through a closed loop control element for adjusting of the spring rate and damping characteristic of the levitation system in response to the sonic frequencies of the levitated machine.

These embodiments of the present invention provide an advantage in that a compensation current flow through the solenoids is controlled by the current regulator in response to the magnetic flux sensors or in response to the load cells in such a way that the compensation current neutralizes machine generated noise effects (force transmission to the machine bed) which are thus prevented from entering the machine bed.

In a further preferred embodiment of the invention the present electromagnetic levitation system comprises a second solenoid coil for providing compensation currents to the solenoid of each electromagnetic levitation bearing. This feature has the advantage that the control system can control in closed loop manner a separate sonic frequency-dependent compensation current which is raised to a magnitude better suited for measurement and control purposes by freely selecting the number of turns of the compensation coil.

In a further preferred embodiment of the present invention, circular or ring magnets with annular coils and cup cores are used and displacement sensors are arranged in a central bore of the cup cores to improve the carrying of the magnetic flux. In this arrangement the cup cores are preferably made of low-resistance, nonlaminated material to generate high eddy currents, which has proved especially advantageous for isolating acoustic vibrations caused by high-frequency sonic waves. Another advantage of the embodiment with circular of ring magnets in the electromagnetic levitation bearings is the fact that the magnetic leakage field outside of the air gap and outside of iron parts carrying the magnetic flux, is reduced.

In a further preferred embodiment of the present invention a closed loop control element comprises frequency filters which at low and medium sonic frequencies enable an active control for the electric current flowing through the solenoids by means of the magnetic flux sensors and the displacement sensors or by means of the load cells and the displacement sensors, and which block the active control at the high sonic frequencies. For low and medium sonic frequencies, the active control achieves an electromagnetic simulation of a mechanical spring having a variable, sonic frequency-dependent spring rate and damping characteristic for an acoustic isolation. When the electromagnetic bearings of the levitation system are sized accordingly, the high and ultrahigh sonic frequencies of the air gap variations advantageously do not cause any reacting forces on the machine bed. This feature is due to the induced voltage generated by the air gap variations and the resultant current in the solenoids plus the eddy currents in the iron of the magnetic circuit, such that the spring rate and damping characteristic for high and ultrahigh sonic frequencies reaches zero whereby a complete insulation of structure-borne noise is achieved.

An essential advantage of the invention is seen in that the present closed loop control permits the implementation of devices for the structure-borne noise insulated levitation of machines by means of electromagnetic levitation systems preferably with more than three electromagnetic bearings for each spatial direction, whereby even bending moments or other adverse strains are not imposed on the machine. Hence, advantageously, elaborate main computers or main closed loop control systems are not required for cancelling such bending moments or adverse strains if each electromagnetic bearing of a statically overdetermined levitation system with more than three bearings for each spatial direction is equipped with a closed loop control in accordance with the present invention.

In a preferred control system using the closed loop controls of the present invention, the electric currents flowing through the coils of the electromagnets are controlled by current regulators such that the machine bed is kept free of alternating forces caused by machine vibrations. Individual pulses like shocks or impact loads, as well as constant or slowly changing continuous loads, such as the rolling motion of ships, are transferred to or by the machine bed without any insulation if not exceeding 5 cps, and are increasingly cushioned between 5 cps and 15 cps. Above 15 cps the closed loop control system of the present invention provides nearly 100% acoustic insulation (active control) which, at 1000 cps, turns into nearly 100% acoustic insulation caused by magnetic induction (internal/passive isolation).

The closed loop control of the present invention is preferably used for controlling air gap widths and for insulating vibrations of levitating systems supporting enclosed power units, for example a prime mover and generator unit for supplying electric power in a ship, or other acoustically sensitive installations. If torque is taken up by, e.g., a work performing driven machine, or torque is outputted by a prime mover, the electric currents flowing through the coils of the electromagnets are preferably controlled in response to a signal representing the torque. When power or acceleration is transmitted, as for example by vehicular engines, the electric currents flowing through the coils of the electromagnets are additionally controlled as a function of signals representing such power or acceleration.

BRIEF DESCRIPTION OF THE DRAWINGS

In order that the invention may be clearly understood it will now be described, by way of example, with reference to the accompanying drawings, wherein:

FIG. 1 is a block diagram illustrating a closed loop control of the invention, cooperating with a mass to be levitated by an electromagnet;

FIG. 4 is a schematic plan-view of a marine power supply unit with a levitation system according to the invention with guide and support magnets and a structure-borne noise insulation

Figure 2:
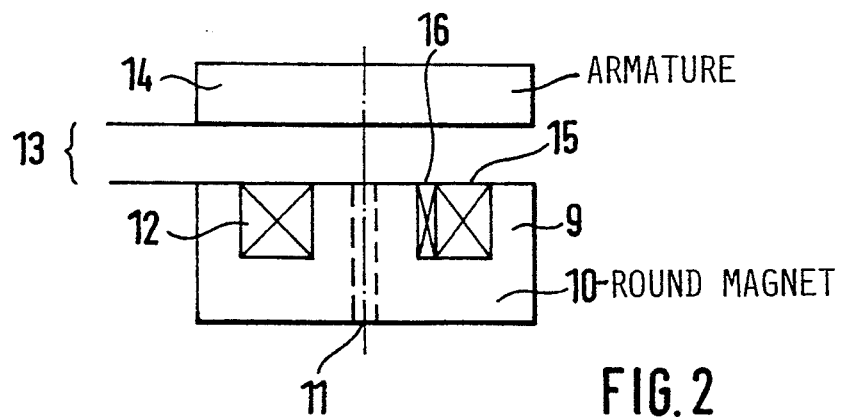
FIG. 2 is a schematic illustration of a circular magnet for a closed loop control as shown in FIG. 1, to achieve an acoustic insulation or noise damping.

DETAILED DESCRIPTION OF PREFERRED EXAMPLE EMBODIMENTS AND OF THE BEST MODE OF THE INVENTION

FIG. 1 is a block diagram illustrating a control device having a closed loop control element 1 and a closed loop control element 5 cooperating with a mass 2 to be suspended and with an electromagnet 3. The loop element 1 has an integrally incorporated control unit and an integrally incorporated current regulator for the current flowing through the solenoid of the electromagnet 3 and a supplementary further control unit and current regulator for the current flowing through a second solenoid to regulate and control compensation currents intended to offset forces acting on the machine bed. The loop element 1 additionally contains frequency filters to evaluate the frequencies of the disturbance force and control the electric currents flowing through the solenoids by means of displacement sensor 4 and magnetic flux sensors 6 in the shape of a displacement pickup and a loadcell or a magnetic flux sensor cooperating with the loop element 5 to represent a spring characteristic (from spring rate and damping capacity), such that in the 5 cps to 15 cps frequency range the electromagnet 3 emulates a mechanical spring of diminishing dynamic force transfer at increasing frequencies.

In the 15 cps to 1000 cps frequency range the magnetic flux sensor 6 is used to sense a magnitude characterizing the alternating magnetic force and readjust the current flowing through the solenoids such that it counteracts the change in magnetic flux and hence the change in force. As a result the magnetic flux is held constant despite the change in the air gap by the vibrations of the mass 2, as would be typical of a power unit consisting of a prime mover and a generator, so that no alternating force is transferred to an electromagnet arranged on, e.g., the machine bed.

The alternating magnetic flux in the air gap, as the magnitude characterizing the alternating force, can alternatively be sensed also by a magnetic flux sensor 6 consisting of, e.g., an induction coil, or by loadcells or load sensing disks.

The current flowing through the solenoids is sensed by the coil current sensor 7.

FIG. 2 is a schematic view of a levitating magnet 9 for use in FIG. 1. The magnet 9 is a circular magnet which is especially suitable for a closed loop control to achieve an acoustic insulation. The circular magnet 9 has a cup-shaped iron core 10 to minimize external magnetic leakage. A central bore 11 in the circular magnet accommodates a displacement sensor 4 only shown in FIG. 1 to measure the changing width of the air gap 13 between core 10 and armature 14. The solenoid or magnet coil 12 is arranged concentrically within the iron core 10 and is not covered by the iron core where it faces the air gap 13. The armature 14 of the magnet 10 is rigidly connected to the mass or machine 2 to be levitated, while the solenoid 12 and the iron core 10 are carried by the machine bed.

The solenoid coil 12 must be supplied, through the current regulator of the control loop element 1, with large quasistatic currents of about 10 amperes in the frequency range of 0 cps to 15 cps for levitating the mass 2. For an active insulation or damping in the 15 cps to 1000 cps frequency range these quasistatic currents having a frequency of 0 cps to 15 cps, are superimposed with milliampere currents with the aid of the closed loop control of the present invention. The currents induced in the solenoid coil 12 due to vibrations in excess of 1000 cps and corresponding air gap width variations are able to flow through the current regulator of the closed loop control 1 without a counteraction by the control 1. Thus, for these frequencies, the active control is disabled.

For achieving an effective internal insulation of the electromagnet 3, the solenoid 12, iron core 10, and magnet armature 14 are constructed so that the currents induced due to air gap variations in the acoustic frequency range, are maximally large and allowed to flow in the absence of an active control. For this purpose, the width of the winding window of the solenoids 12 in the iron core 10 is made large in relation to the height of the winding window, and the solenoid 12 is constructed as a coil having a low ohmic resistance.

The magnetic flux carrying material of the iron core 10 and of the magnet armature 14 is, unlike the iron core of transformers, not laminated and made of solid, soft magnetic and electrically well conductive material, allowing large eddy currents for increasing the internal noise insulation (intriusic noise isolation).

In a further embodiment of the present invention the circular magnet 9 has two solenoids 15 and 16 in the iron core 10 instead of the solenoid 12. One large solenoid 15 is a levitating coil with a large number of windings energized by a high power current regulator 1. The second solenoid coil 16 functions as a compensation coil and has a smaller number of windings energized through a second current regulator of lower output. In this manner the high power output regulator for the levitating coil will not have to satisfy the high accuracy requirements needed for controlling the acoustic insulation. Further, the currents in the compensation coil 16 needed for an active acoustic damping or insulation are no longer in the milliampere range, but can be raised into a range better suited for the compensation control. This is possible due to the lower number of windings in the compensation coil 16. The low power requirement of the compensation coil 16 allows the use of a power amplifier that need not be clocked, for the second current regulator, to achieve the active acoustic insulation.

Figure 3:
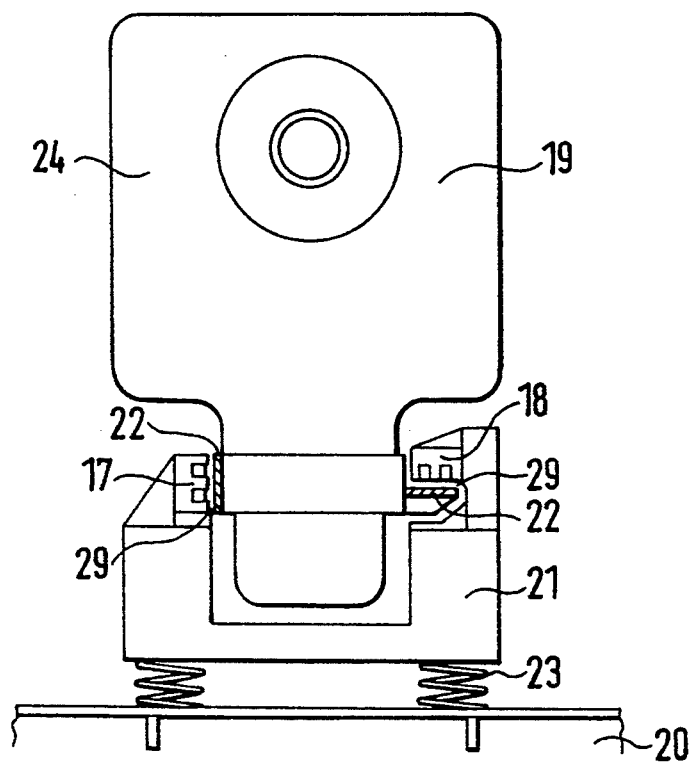
FIG. 3 is a schematic front-view of a power supply unit illustrating a structure-borne noise insulated, noise damping, levitation system with guide and support magnets.

FIG. 3 is a schematic front view illustration of mounting for a power supply unit 19 which levitates the power supply unit 19 and which also insulates, structure-borne noise. The mounting has guide magnets 17 and support magnets 18, resting on a ship's machine bed 20. For acoustic insulation the guide magnets 17 and support magnets 18 are constructed so that the closed loop control of the present invention operates between a frame 21 carrying the magnetic cores and coils and the power supply unit 19 fitted with the associated magnet armatures 22. Pulsetype shock loads are cushioned by shock absorbers 23 arranged between the frame 21 and the ship's machine bed 20.

The spring rate and damping values of the present closed loop control element 5 in FIG. 1, is adjusted so that under the ship's pitch and roll motions, or slam acceleration and deceleration of a vehicle, the power supply unit 19 is supported and guided within the narrow boundaries of the air gaps 29, see FIG. 4. At acoustic frequencies below 15 cps, mechanical springs are simulated by means of the present closed loop control in the electromagnetic bearings in accordance with the settings in the control loop element 5 of FIG. 1, so that the spring rate and the damping force decrease with an increasing frequency. In the frequency range above 15 cps the levitated unit 19 is allowed to vibrate freely within the widths of the air gaps 29 and within the amplitudes of its vibrations, without any transmission of forces to the frame 21 or the ship's machine bed 20. For frequencies above 1000 cps, the internal insulation caused by the currents induced in the coils and eddy currents generated in the magnets 17 and 18, is already sufficiently high to prevent structure-borne noise from being transmitted to the ship's machine bed 20 even in the absence of active control.

FIG. 4 is a schematic plan view of a ship's power supply unit 19 supported by a levitation system that insulates structure borne noise. The unit 19 comprises a prime mover 28 and a generator 27 interconnected by an engine shaft 24. The levitation is provided by the guide magnets 17 and support magnets 18. The plurality of necessary bearing points with magnets 25 for longitudinal or axial guidance and magnets 26 for lateral or radial guidance and magnets 18 for levitating makes it apparent what adverse strains such a support and guidance system will impose on a ship's power unit 19 if the electromagnetic bearings are fitted with constant-clearance control units and lack a main closed loop control unit. In the embodiment shown in FIG. 4, each individual bearing is fitted with a closed loop control of the present invention to simulate a mechanical spring effective in the air gap for high continuous and alternating loads having a frequency under 15 cps.

Although the invention has been described with reference to specific example embodiments it will be appreciated that it is intended to cover all modifications and equivalents within the scope of the appended claims.

What we claim is:

1. A closed loop control apparatus for controlling an air gap width in an electromagnetic levitation system for levitating a mass above a machine bed, comprising magnetic means (3) including an energizing coil arranged for levitating said mass, closed loop control circuit means for energizing said energizing coil of said magnet means, said closed loop control circuit means comprising simulator means (1,5) for providing a feed back control signal to said energizing coil to simulate electromagnetically a mechanical spring characteristic, sensor means (4,6,7) arranged for sensing at least two control values as a force representing control value, said closed loop control circuit means feeding back said control values to said simulator means (1,5), said simulator means comprising a current controller and frequency filter means responsive to said force representing control value for providing an energizing current to said magnet energizing coil in such a way that an active control of an energizing current supplied to said energizing coil, is provided in response to low and intermediate noise frequencies up to about 1000 cps and so that said active control of said energizing current is blocked in response to noise frequencies above about 1000 cps.

2. The closed loop control apparatus of claim 1, wherein said sensor means comprise at least one load cell (6) for providing a further control value representing a magnetic force or an electric energizing current flowing through said energizing coil of said magnet means, and means supplying said further control value to said current controller.

3. The closed loop control apparatus of claim 1, wherein said sensor means comprise a displacement sensor (4) for sensing a width of an air gap between said magnet means and an armature connected to said mass for providing an air gap width representing control value to said simulator means (5).

4. The closed loop control apparatus of claim 1, wherein said sensor means comprise a magnetic flux sensor (6) for providing a magnetic flux representing control value to said current controller of said simulator means (1).

5. The closed loop control apparatus of claim 1, wherein said magnet means (3) comprise, in addition to said energizing coil (12), a magnet armature (14,22), said magnet means and energizing coil being secured to said machine bed, said magnet armature (22) being secured to said mass.

6. The closed loop control apparatus of claim 1, wherein said magnet means comprise in addition to said energizing coil (15), a further compensation coil (16) for applying a compensation current to said compensation coil (16) in each levitating magnet means.

7. The closed loop control apparatus of claim 1, wherein said magnet means comprise a ring magnet with a cup magnet core (10), said energizing coil (12) comprising a ring solenoid in said cup magnet core, and a central bore (11) in said cup magnet core, said sensor means comprising an air gap width sensor in said central bore (11).

8. The closed loop control apparatus of claim 1, wherein said magnet means comprise an armature (14) and a cup magnet core (10) both of which are made of nonlaminated, low ohmic resistance magnetic material for generating high eddy currents.

9. The closed loop control apparatus of claim 1, wherein said levitating magnet means comprise more than three individual levitating magnets for each spatial direction, each of said individual levitating magnets comprising its own closed loop control.

10. A method for controlling an electromagnetic levitation system comprising the steps:
    (a) controlling in a closed loop circuit the electric currents flowing through coils of levitation electromagnets by means of current regulators, and
    (b) supplying frequency responsive feedback signals to said current regulators so as to electromagnetically simulate by means of closed loop control elements (1, 3+5), a spring characteristic having a frequency-dependent spring rate and damping characteristic in such a way that said spring rate and damping characteristic are maintained in accordance with a given levitation function at low frequencies under 5 cps, and that said spring rate and damping characteristic decrease in response to an increasing sonic frequency within the range of 5 cps to 1000 cps, and that said spring rate and damping characteristic approach zero for sonic frequencies above 1000 cps, such that a machine bed remains free of alternating forces caused by machine vibrations.

11. The method of claim 10, for a levitation system of a power supply unit comprising a prime mover and a driven machine, wherein said step of controlling electric currents flowing through coils of said levitation electromagnets comprises controlling said electric currents as a function of position and weight of said power supply unit.

12. The method of claim 10, for a levitation system for a vehicular engine, wherein said step of controlling electric currents flowing through coils of said levitation electromagnets comprises controlling said electric currents as a function of power, acceleration or torque.

* * * * *

UNITED STATES PATENT AND TRADEMARK OFFICE
CERTIFICATE OF CORRECTION

PATENT NO. : 5,387,851

DATED : February 7, 1995

INVENTOR(S) : Nuscheler et al.

It is certified that error appears in the above identified patent and that said Letters Patent is hereby corrected as shown below:

Title page:
In [56] References Cited, the date for U.S. Pat. 5,275,388 should be --1/1994--;
the name for U.S. Pat. 5,285,995 should be --Gonzalez et al.--.

Col. 1, line 42, replace "buse," by --buses,--.

Col. 2, line 25, replace "ultra sonic" by --ultrasonic--;
line 33, replace "ultra sonic" by --ultrasonic--;
line 38, after "quencies." insert a paragraph spacing;
line 68, replace "leviation" by --levitation--.

Col. 6, line 37, replace "intriusic" by --intrinsic--;
line 68, replace "Pulsetype" by --Pulse-type--.

Signed and Sealed this

Eleventh Day of April, 1995

*Attest:*

BRUCE LEHMAN

*Attesting Officer*  *Commissioner of Patents and Trademarks*